United States Patent
Hashimoto et al.

(10) Patent No.: US 10,464,550 B2
(45) Date of Patent: Nov. 5, 2019

(54) ABNORMALITY DETECTION OF CURRENT SENSOR FOR ELECTRICALLY HEATED CATALYST DEVICE IN HYBRID VEHICLE

(71) Applicant: Toyota Jidosha Kabushiki Kaisha, Toyota-shi, Aichi-ken (JP)

(72) Inventors: Keita Hashimoto, Toyota (JP); Takahiro Suzuki, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 340 days.

(21) Appl. No.: 15/490,093

(22) Filed: Apr. 18, 2017

(65) Prior Publication Data
US 2017/0305414 A1   Oct. 26, 2017

(30) Foreign Application Priority Data
Apr. 20, 2016 (JP) ................................ 2016-084422

(51) Int. Cl.
*B60W 20/50* (2016.01)
*B60W 10/06* (2006.01)
(Continued)

(52) U.S. Cl.
CPC .............. *B60W 20/50* (2013.01); *B60L 53/00* (2019.02); *B60L 58/13* (2019.02); *B60W 10/06* (2013.01);
(Continued)

(58) Field of Classification Search
CPC .............. B60W 20/50; B60W 2710/30; B60W 2400/00; B60W 2710/06; B60W 10/30;
(Continued)

(56) References Cited

U.S. PATENT DOCUMENTS 5,428,955 A * 7/1995 Yuuki ................... F01N 3/2013
                                                           60/276
5,555,725 A    9/1996 Shimasaki et al.
(Continued)

FOREIGN PATENT DOCUMENTS

DE    102011122440 A1   6/2012
DE    102014219807 A1   3/2016
(Continued)

OTHER PUBLICATIONS

U.S. Appl. No. 15/491,425, filed Apr. 19, 2017 Inventors: 1. Keita Hashimoto 2. Takahiro Suzuki.
(Continued)

*Primary Examiner* — Jelani A Smith
*Assistant Examiner* — Majdi Alsomiri
(74) *Attorney, Agent, or Firm* — Dinsmore & Shohl LLP

(57) ABSTRACT

A control device executes abnormality detection processing for detecting an abnormality of a current sensor. The abnormality detection processing includes first processing which is executed in a case where, during reception of electric power from a power supply, a state of charge of a power storage device is equal to or greater than a predetermined amount and electric power is supplied to an electrically heated catalyst device. The first processing includes processing for detecting an abnormality of the current sensor by estimating a current supplied to the electrically heated catalyst device using a detection value of a charging current sensor and comparing the estimated value with a detection value of the current sensor.

4 Claims, 7 Drawing Sheets

(51) Int. Cl.
*B60L 11/18* (2006.01)
*G07C 5/08* (2006.01)
*F01N 3/20* (2006.01)
*B60W 10/30* (2006.01)
*B60L 53/00* (2019.01)
*B60L 58/13* (2019.01)

(52) U.S. Cl.
CPC ............ *B60W 10/30* (2013.01); *F01N 3/2013* (2013.01); *G07C 5/0808* (2013.01); *B60W 2400/00* (2013.01); *B60W 2710/06* (2013.01); *B60W 2710/30* (2013.01); *B60Y 2200/92* (2013.01); *F01N 2550/22* (2013.01)

(58) Field of Classification Search
CPC ...... B60W 10/06; G07C 5/0808; B60L 58/13; B60L 53/00; Y02T 10/26; Y02T 10/22; Y02A 50/2324; F01N 2240/16; F01N 2900/0416; F01N 2590/11; F01N 2550/22; F01N 3/101; F01N 3/103; F01N 3/2013; B60Y 2200/92
See application file for complete search history.

(56) References Cited

U.S. PATENT DOCUMENTS

| | | | |
|---|---|---|---|
| 2008/0094762 | A1 | 4/2008 | Ochiai |
| 2009/0277705 | A1* | 11/2009 | Ichikawa ............... B60K 6/445 180/65.275 |
| 2011/0320082 | A1* | 12/2011 | Ishishita ................ B60K 6/445 701/22 |
| 2012/0317960 | A1* | 12/2012 | Sato ....................... F01N 11/007 60/276 |
| 2013/0249283 | A1 | 9/2013 | Yokoyama |
| 2013/0255228 | A1* | 10/2013 | Sakamoto ............... F01N 11/00 60/274 |
| 2013/0291630 | A1* | 11/2013 | Takagi ................... F01N 3/2013 73/114.75 |
| 2014/0290216 | A1 | 10/2014 | Katsuta |
| 2014/0290348 | A1* | 10/2014 | Nakajima ............ G01M 15/102 73/114.75 |
| 2014/0292350 | A1* | 10/2014 | Yoshioka ............. F01N 3/2013 324/551 |
| 2015/0057857 | A1* | 2/2015 | Katsuta ................. F01N 3/2013 701/22 |
| 2015/0075142 | A1 | 3/2015 | Hashimoto et al. |
| 2015/0301009 | A1* | 10/2015 | Miyake .................. F01N 3/023 422/83 |
| 2016/0126573 | A1 | 5/2016 | Yoon et al. |

FOREIGN PATENT DOCUMENTS

| | | |
|---|---|---|
| EP | 1859528 A1 | 11/2007 |
| EP | 2716885 A1 | 4/2014 |
| JP | H08061048 A | 3/1996 |
| JP | 2007-258018 A | 10/2007 |
| JP | 2015-175759 A | 10/2015 |
| KR | 101610534 B1 | 4/2016 |
| WO | 2006/100992 A1 | 9/2006 |
| WO | 2012/081330 A1 | 6/2012 |
| WO | 2012/164715 A1 | 12/2012 |

OTHER PUBLICATIONS

Notice of Allowability issued to U.S. Appl. No. 15/491,425 dated Mar. 13, 2019.
Office Action issued to U.S. Appl. No. 15/491,425 dated Sep. 6, 2018.
Notice of Allowance issued to U.S. Appl. No. 15/491,425 dated Jan. 24, 2019.

* cited by examiner

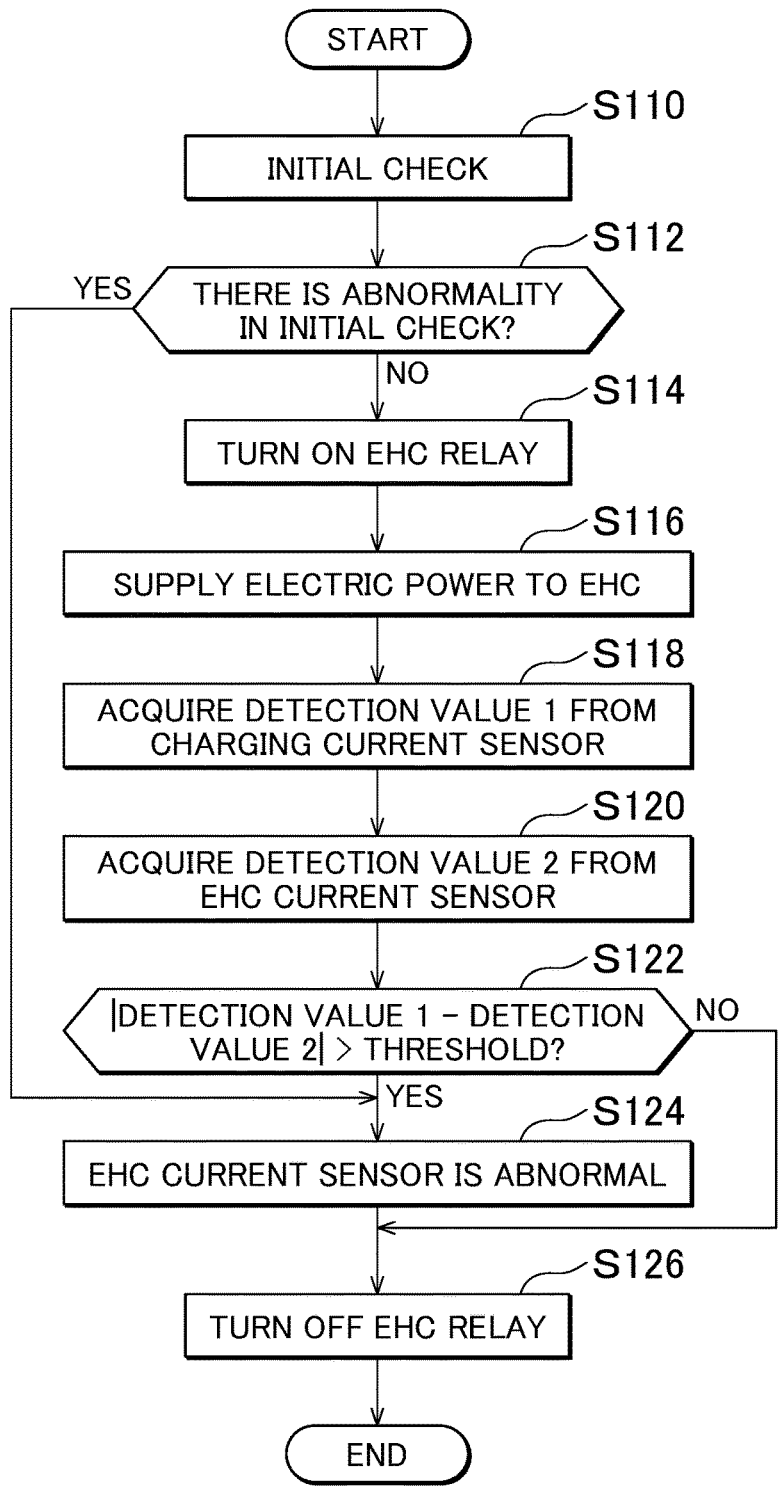

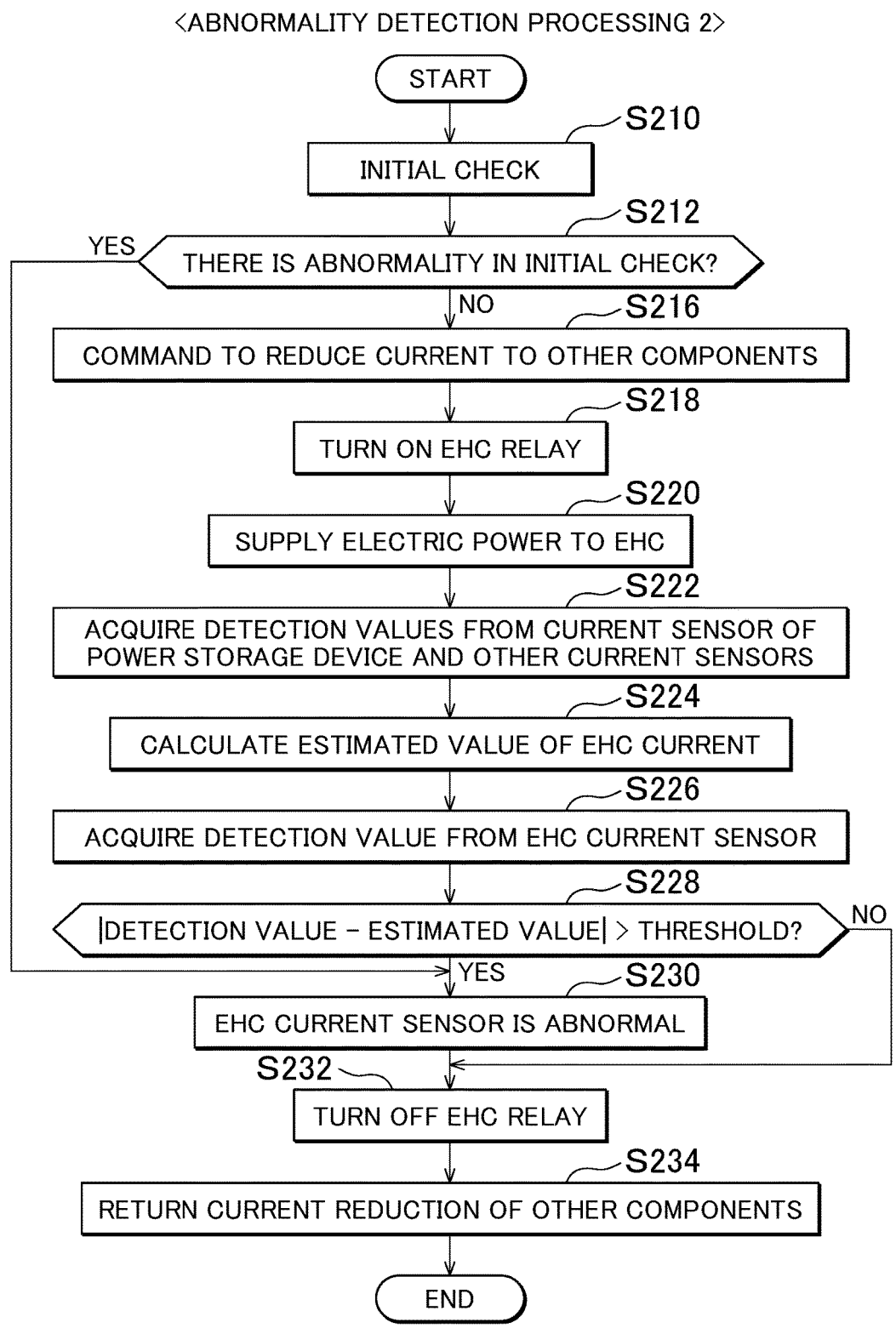

ABNORMALITY DETECTION OF CURRENT SENSOR FOR ELECTRICALLY HEATED CATALYST DEVICE IN HYBRID VEHICLE

CROSS-REFERENCE TO RELATED APPLICATIONS

This application claims priority to Japanese Patent Application No. 2016-084422 filed on Apr. 20, 2016, the entire contents of which are hereby incorporated by reference.

BACKGROUND

1. Technical Field

The technical field relates to a hybrid vehicle in which an internal combustion engine and an electric motor for vehicle traveling are mounted, and in particular, to a hybrid vehicle in which a power storage device configured to store electric power supplied to the electric motor is chargeable with an external power supply provided outside the vehicle.

2. Description of Related Art

A hybrid vehicle in which an internal combustion engine and an electric motor for vehicle traveling are mounted and a power storage device configured to store electric power supplied to the electric motor is chargeable with an external power supply provided outside the vehicle is known (hereinafter, charging of the power storage device with the external power supply is referred to as "external charging"). Even in such an externally chargeable hybrid vehicle, a catalyst which purifies exhaust gas of the internal combustion engine is provided in an exhaust passage. In a case where the catalyst does not reach an activation temperature, it is not possible to sufficiently purify exhaust gas.

An electrically heated catalyst (hereinafter, referred to as "EHC") which is configured such that the catalyst can be electrically heated in order to warm up the catalyst before the start of the internal combustion engine has been suggested. Japanese Patent Application Publication No. 8-61048 (JP 8-61048 A) discloses a control device for such an EHC. In this control device, an operation state of the EHC is detected based on a catalyst voltage applied to the EHC, a catalyst current flowing in the EHC, a catalyst temperature calculated based on the catalyst voltage and the catalyst current, and the like, and an abnormality of the EHC is detected based on the detection result (see JP 8-61048 A).

SUMMARY

If an abnormality occurs in a current sensor (hereinafter, referred to as "EHC current sensor") which detects a current supplied to the EHC, it is not possible to correctly ascertain electric power supplied to the EHC, and the following problems may occur. That is, for example, in a case where the EHC current sensor indicates a value higher than an actual current, electric power supplied to the EHC becomes small, and there is a possibility that the EHC is not sufficiently warmed up and the exhaust purification performance of the EHC is deteriorated. In a case where the EHC current sensor indicates a value lower than the actual current, electric power supplied to the EHC becomes excessive, a locally overheated portion is generated in the EHC, and matrix cracking of the EHC may occur due to thermal stress. Accordingly, although it is necessary to detect an abnormality of the EHC current sensor, duplexing of the EHC current sensor for detection of an abnormality of the EHC current sensor causes increase in cost, an increase in facility size, or the like.

In the externally chargeable hybrid vehicle, electric power received from the external power supply may be supplied to the EHC during reception of electric power from the external power supply, and an abnormality of the EHC current sensor may be detected based on a detection value of the EHC current sensor at this time. However, in a case where the detection of an abnormality of the EHC current sensor is executed during reception of electric power from the external power supply, it is necessary to consider a user's intention to secure the amount of charge of the power storage device through external charging for next traveling early.

If an increase in cost, an increase in facility size, or the like is caused by duplexing of the EHC current sensor, or a user's request for external charging is interrupted due to the detection of an abnormality of the EHC current sensor, there is a possibility that marketability of the vehicle is damaged. Such a problem has not been particularly examined in JP 8-61048 A described above.

An object of the disclosure is to detect an abnormality of an EHC current sensor without duplexing the EHC current sensor while considering a user's request for external charging in a hybrid vehicle in which an internal combustion engine and an electric motor for vehicle traveling are mounted and a power storage device configured to store electric power supplied to the electric motor is externally chargeable.

A hybrid vehicle according to an aspect of the disclosure is a hybrid vehicle in which an internal combustion engine and an electric motor for vehicle traveling are mounted. The hybrid vehicle includes a power storage device, a charging device, an electrically heated catalyst device, first and second current sensors, and a control device. The power storage device is configured to store electric power supplied to the electric motor. The charging device is configured to receive electric power from an external power supply provided outside the hybrid vehicle to charge the power storage device. The electrically heated catalyst device has a catalyst configured to purify exhaust gas discharged from the internal combustion engine and is configured to receive electric power through the charging device to electrically heat the catalyst. The first current sensor (EHC current sensor) is configured to detect a current supplied to the electrically heated catalyst device. The second current sensor is configured to detect a current received from the external power supply by the charging device. The control device is configured to execute abnormality detection processing for detecting an abnormality of the first current sensor. The abnormality detection processing includes first processing which is executed in a case where, during reception of electric power from the external power supply, (i) a state of charge (SOC) of the power storage device is equal to or greater than a predetermined amount and (ii) electric power is supplied to the electrically heated catalyst device. The first processing includes processing for detecting an abnormality of the first current sensor by estimating a value of the current supplied to the electrically heated catalyst device using a detection value of the second current sensor and comparing the estimated value with a detection value of the first current sensor.

According to the hybrid vehicle of the aspect of the disclosure, in a case where electric power is supplied to the electrically heated catalyst device during reception of electric power from the external power supply, a values of the current supplied to the electrically heated catalyst device is estimated using the detection value of the second current sensor, and an abnormality of the first current sensor is detected by comparing the estimated value with the detection value of the first current sensor (EHC current sensor). For this reason, it is not necessary to duplex the first current sensor in order to detect an abnormality of the first current sensor. The abnormality detection is executed when the SOC of the power storage device is equal to or greater than the predetermined amount, it is possible to respond to a user's request to secure the amount of charge of the power storage device through external charging for next traveling early. Therefore, according to this hybrid vehicle, it is possible to detect an abnormality of the EHC current sensor without duplexing the EHC current sensor while considering a user's request for external charging.

The hybrid vehicle according to the aspect of the disclosure may further include a third current sensor. The third current sensor may be configured to detect an input/output current of the power storage device. The control device may be configured to execute timer charging for charging the power storage device according to a set time schedule with the external power supply through the charging device. The abnormality detection processing may further include second processing which is executed instead of the first processing before the execution of the timer charging in a case where the timer charging is set. The second processing may include processing for detecting an abnormality of the first current sensor by controlling the charging device such that electric power is supplied from the power storage device to the electrically heated catalyst device through the charging device, estimating the current supplied to the electrically heated catalyst device using a detection value of the third current sensor, and comparing the estimated value with the detection value of the first current sensor.

In this hybrid vehicle, in a case where the timer charging is set, the detection of an abnormality of the first current sensor is executed before the execution of the timer charging. For this reason, it is possible to avoid a situation in which charging is delayed due to the execution of the abnormality detection during the execution of the timer charging, or the abnormality detection is not executed in a case where the timer charging is cancelled and departure is performed. Since the external charging is on standby for execution (power reception standby state) before the execution of the timer charging, in this hybrid vehicle, electric power is supplied from the power storage device to the electrically heated catalyst device through the charging device, and the current supplied to the electrically heated catalyst device is estimated using the detection value of the third current sensor. Then, an abnormality of the first current sensor is detected by comparing the estimated value with the detection value of the first current sensor (EHC current sensor). For this reason, it is not necessary to duplex the first current sensor in order to detect an abnormality of the first current sensor. Therefore, according to this hybrid vehicle, it is possible to detect an abnormality of the EHC current sensor without duplexing the EHC current sensor while enabling the execution of the timer charging according to the time schedule.

According to this aspect, in the hybrid vehicle in which the internal combustion engine and the electric motor for vehicle traveling are mounted and the power storage device configured to store electric power supplied to the electric motor is externally chargeable, it is possible to detect an abnormality of the EHC current sensor without duplexing the EHC current sensor while considering a user's request for external charging.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a flowchart illustrating a procedure of abnormality detection processing 1 which is executed in Step S16 of FIG. 5; and FIG. 7 is a flowchart illustrating a procedure of abnormality detection processing 2 which is executed in Step S30 of FIG. 5.

DETAILED DESCRIPTION OF EMBODIMENTS

Figure 1:
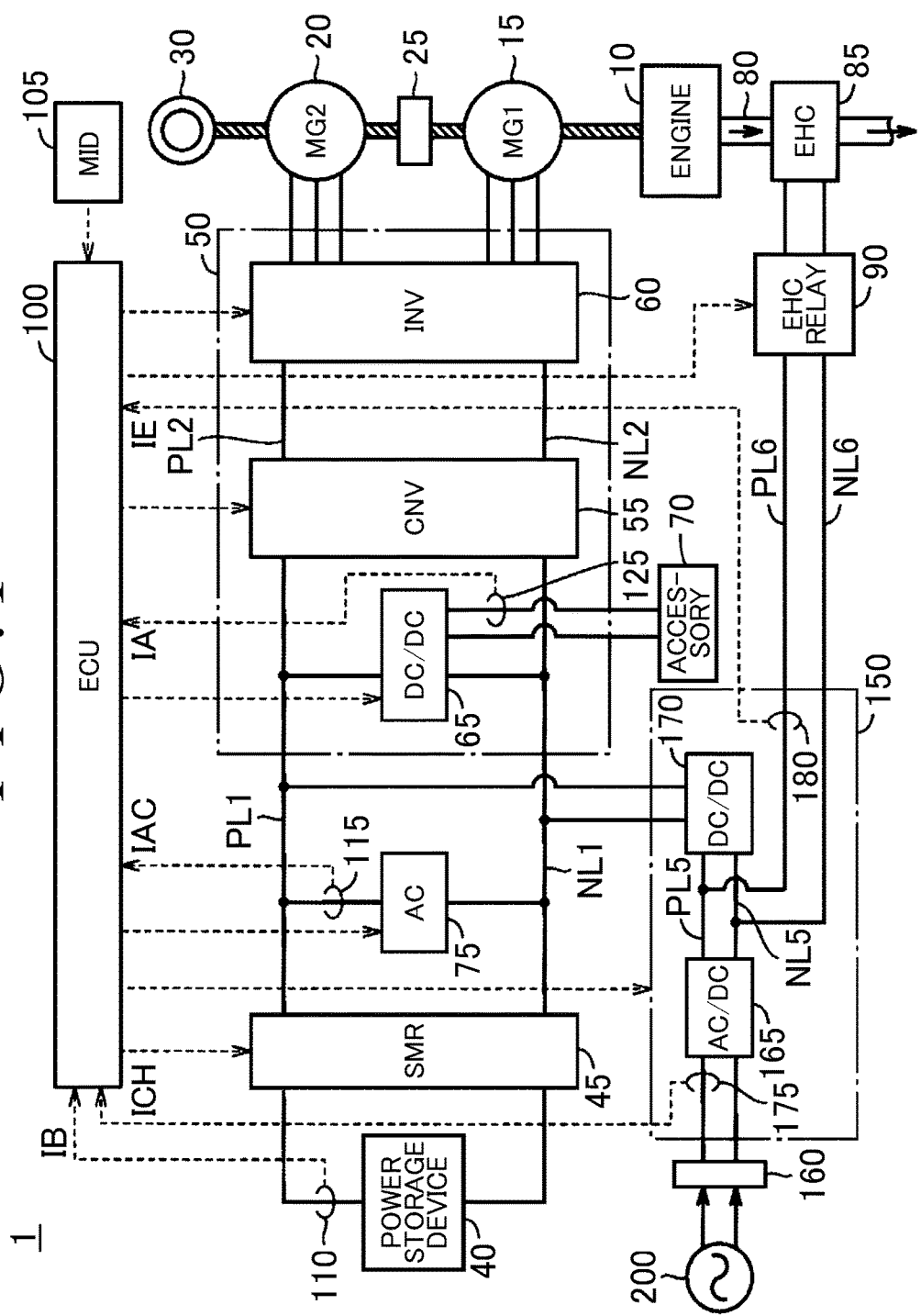
FIG. 1 is an overall configuration diagram of a hybrid vehicle according to an embodiment.

Hereinafter, an embodiment will be described in detail referring to the drawings. The same or similar portions in the drawings are represented by the same reference numerals, and description thereof will not be repeated.

FIG. 1 is an overall configuration diagram of a hybrid vehicle according to an embodiment. Referring to FIG. 1, a hybrid vehicle 1 includes an engine 10, motor generators 15, 20, a power distribution device 25, drive wheels 30, an exhaust passage 80, and an EHC 85.

The engine 10 is an internal combustion engine which outputs power by converting combustion energy generated by combustion of a mixture of air and fuel to kinetic energy of a motion element, such as a piston or a rotor.

The motor generators 15, 20 are AC rotating electric machines, and for example, three-phase AC synchronous electric motors in which a permanent magnet is embedded in a rotor. The motor generator 15 is used as a power generator which is driven by the engine 10 by way of the power distribution device 25 and is used as an electric motor which starts the engine 10. The motor generator 20 is primarily operated as an electric motor and drives the drive wheels 30. At the time of vehicle braking or acceleration reduction on a downhill, the motor generator 20 is operated as a power generator to perform regenerative electric power generation.

The power distribution device 25 includes, for example, a planetary gear mechanism having three rotational shafts of a sun gear, a carrier, and a ring gear. The power distribution device 25 distributes drive power of the engine 10 into power which is transmitted to the rotational shaft of the motor generator 15 and power which is transmitted to the drive wheels 30.

The EHC 85 is provided in the exhaust passage 80 of the engine 10. The EHC 85 has a catalyst which purifies exhaust gas discharged from the engine 10, and is configured to receive electric power from a charging device 150 through a pair of power lines PL6, NL6 and an EHC relay 90 to electrically heat the catalyst. The charging device 150 and the EHC relay 90 will be described below.

Figure 2:
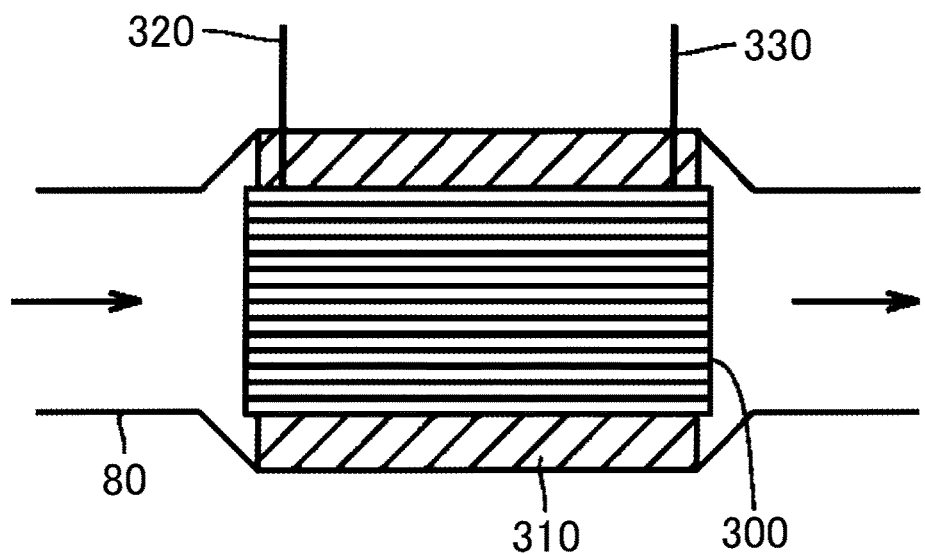
FIG. 2 is a diagram showing the configuration of an EHC.

FIG. 2 is a diagram showing the configuration of the EHC 85. In FIG. 2, a cross-section along an exhaust direction of the EHC 85 is shown. Referring to FIG. 2, the EHC 85 includes a catalyst carrier 300, an insulating member 310, and electrodes 320, 330.

The catalyst carrier 300 is incorporated in the exhaust passage 80, and is constituted of, for example, a conductive member having a columnar shape or an elliptical columnar shape in which a cross-section orthogonal to the exhaust direction has a honeycomb structure. A three-way catalyst, an oxidation catalyst, or the like (not shown) is carried on the catalyst carrier 300, and harmful ingredients included in exhaust gas passing through the EHC 85 are removed by the catalyst carrier 300.

The insulating member 310 is provided between an outer circumferential surface of the catalyst carrier 300 and an inner circumferential surface of the exhaust passage 80, and is constituted of a member having electric insulation and heat resistance. For the insulating member 310, for example, an insulating material, such as alumina, is used.

The electrode 320 is electrically connected to the conductive catalyst carrier 300 in an end portion on an exhaust upstream side of the catalyst carrier 300. The electrode 330 is electrically connected to the catalyst carrier 300 in an end portion on an exhaust downstream side of the catalyst carrier 300. The other ends of the electrodes 320, 330 are connected to the pair of power lines PL6, NL6 through the EHC relay 90. If a voltage is applied from the pair of power lines PL6, NL6 to the catalyst carrier 300 through the electrodes 320, 330, a current flows in the conductive catalyst carrier 300, and the catalyst carrier 300 generates heat due to electric resistance of the catalyst carrier 300. With this, the temperature of the three-way catalyst or the oxidation catalyst carried on the catalyst carrier 300 increases, and the EHC 85 is brought into a catalyst activation state in which exhaust gas can be effectively purified.

The configuration of the EHC 85 is not limited to that shown in FIG. 2, and various known EHCs can be applied for the EHC 85.

Referring to FIG. 1 again, the hybrid vehicle 1 includes a power storage device 40, a system main relay (hereinafter, referred to as "SMR") 45, a power control unit (hereinafter, referred to as "PCU") 50, an accessory 70, and an electric air conditioner 75. The hybrid vehicle 1 further includes an electronic control device (hereinafter, referred to as "ECU") 100, a multi information display (MID) 105, current sensors 110, 115, 125, a charging device 150, a power receiving unit 160, current sensors 175, 180, and an EHC relay 90.

The power storage device 40 is a rechargeable DC power supply, and includes, for example, a secondary battery, such as a nickel-hydrogen battery or a lithium-ion battery. The power storage device 40 supplies electric power to the PCU 50 and the electric air conditioner 75, and as described above, can supply electric power to the EHC 85 through the charging device 150. The power storage device 40 is charged by receiving generated electric power through the PCU 50 at the time of electric power generation of the motor generator 15 and/or 20. The power storage device 40 can be charged by receiving electric power supplied from the power supply 200 outside the vehicle through the power receiving unit 160 and the charging device 150. As the power storage device 40, a large-capacity capacitor is employable.

The state of charge (SOC) of the power storage device 40 is represented, for example, by a percentage of a current power storage amount with respect to the full charge capacity of the power storage device 40. The SOC is calculated, for example, based on an input/output current and/or an output voltage of the power storage device 40 detected by the current sensor 110 and/or a voltage sensor (not shown). The SOC may be calculated by an ECU separately provided in the power storage device 40, or may be calculated based on the detection value of the input/output current and/or the output voltage of the power storage device 40 by the ECU 100.

The SMR 45 is provided between the power storage device 40 and a pair of power lines PL1, NL1, and is switched between on (conduction state)/off (power shutoff state) in response to a control signal from the ECU 100. The SMR 45 is turned on according to the control signal from the ECU 100, for example, if a user who intends to start traveling operates a power switch (not shown) in a state of depressing a brake pedal or execution of external charging is requested.

The PCU 50 includes a boost converter 55, an inverter 60, and a DC/DC converter 65. The boost converter 55 is provided between the pair of power lines PL1, NL1 and a pair of power lines PL2, NL2, and boosts a voltage between the pair of power lines PL2, NL2 to be equal to or greater than a voltage between the pair of power lines PL1, NL1 based on a control signal from the ECU 100. The boost converter 55 is constituted of, for example, a current variable boost chopper circuit.

The inverter 60 is provided between the pair of power lines PL2, NL2 and the motor generators 15, 20. The inverter 60 drives the motor generators 15, 20 based on a control signal from the ECU 100. The inverter 60 is constituted of, for example, a bridge circuit including switching elements for three phases provided for each of the motor generators 15, 20.

The DC/DC converter 65 is connected to the pair of power lines PL1, NL1, and deboosts electric power received from the pair of power lines PL1, NL1 to an accessory voltage based on a control signal from the ECU 100, and supplies the accessory voltage to the accessory 70. The accessory 70 integrally shows various accessories and an accessory battery which are mounted in the hybrid vehicle 1.

The electric air conditioner 75 is connected to the pair of power lines PL1, NL1, and receives operation electric power from the power storage device 40 through the pair of power lines PL1, NL1. The electric air conditioner 75 performs temperature adjustment in the vehicle interior of the hybrid vehicle 1 based on a control signal from the ECU 100.

The current sensor 110 detects a current IB input/output to/from the power storage device 40 and outputs the detection value to the ECU 100. The current sensor 115 detects a current IAC supplied from the power storage device 40 to the electric air conditioner 75 through the pair of power lines PL1, NL1 and outputs the detection value to the ECU 100. The current sensor 125 detects a current IA supplied from the power storage device 40 to the accessory 70 through the DC/DC converter 65 and outputs the detection value to the ECU 100.

The charging device 150 includes an AC/DC converter 165 and a DC/DC converter 170. The AC/DC converter 165 is provided between the power receiving unit 160 and a pair of power lines PL5, NL5, converts AC electric power supplied from the power supply 200 outside the vehicle through the power receiving unit 160 to DC electric power based on a control signal from the ECU 100, and outputs DC electric power to the pair of power lines PL5, NL5.

The DC/DC converter 170 is provided between the pair of power lines PL5, NL5 and the pair of power lines PL1, NL1, and is configured to convert a voltage in two directions. The DC/DC converter 170 converts electric power received from the AC/DC converter 165 to a voltage level of the power storage device 40 based on a control signal from the ECU 100 at the time of the execution of the external charging and outputs electric power to the power storage device 40 through the pair of power lines PL1, NL1. Furthermore, the DC/DC converter 170 can convert electric power received from the pair of power lines PL1, NL1 to a rated voltage level of the EHC 85 based on a control signal from the ECU 100 and can output electric power to the EHC 85 through the pair of power lines PL6, NL6 connected to the pair of power lines PL5, NL5.

The pair of power lines PL6, NL6 connected to the EHC 85 through the EHC relay 90 is connected to the pair of power lines PL5, NL5 which connects the AC/DC converter 165 and the DC/DC converter 170.

The EHC relay 90 is provided between the pair of power lines PL6, NL6 and the EHC 85. The EHC relay 90 is switched between on (conduction state)/off (power shutoff state) in response to a control signal from the ECU 100. The EHC relay 90 is turned on according to the control signal from the ECU 100 in a case where supply of electric power to the EHC 85 is required.

The charging device 150 having the above-described configuration converts electric power supplied from the power supply 200 outside the vehicle through the power receiving unit 160 to the voltage level of the power storage device 40 at the time of the execution of the external charging and outputs electric power to the power storage device 40 through the pair of power lines PL1, NL1. The charging device 150 can supply electric power to the EHC 85 through the AC/DC converter 165, the pair of power lines PL5, NL5, and the pair of power lines PL6, NL6 at the time of reception of electric power from the power supply 200. In addition, the charging device 150 can supply electric power received from the pair of power lines PL1, NL1 to the EHC 85 through the DC/DC converter 170, the pair of power lines PL5, NL5, and the pair of power lines PL6, NL6 in a case where the external charging is not performed.

The power receiving unit 160 receives electric power supplied from the power supply 200 and outputs electric power to the charging device 150. In the following description, it is assumed that the power receiving unit 160 is constituted of an inlet to which a connector of a charging cable connected to the power supply 200 is connectable. It should be noted that the power receiving unit may be constituted of a power receiving coil which is capable of receiving electric power from a power transmitting coil provided on the power supply 200 side through a magnetic field in a noncontact manner.

The current sensor 175 detects a current ICH from the power receiving unit 160 to the AC/DC converter 165 and outputs the detection value to the ECU 100. That is, the current sensor 175 is a charging current sensor (hereinafter, the current sensor 175 is referred to as a "charging current sensor 175") which detects the current ICH received from the power supply 200 by the charging device 150.

The current sensor 180 detects a current IE flowing in the power line PL6 and outputs the detection value to the ECU 100. That is, the current sensor 180 is an EHC current sensor (hereinafter, the current sensor 180 is referred to as an "EHC current sensor 180") which detects the current IE supplied to the EHC 85.

The MID 105 is a display device which displays various kinds of information in the hybrid vehicle 1 and enables a user's operation input, and includes, for example, a liquid crystal display, an organic electroluminescence (EL) display, or the like which enables a touch input. In the hybrid vehicle 1 according to this embodiment, timer charging in which the external charging is started according to a set time schedule is executable, and the MID 105 is configured such that the user is capable of set the timer charging. Specifically, the MID 105 is configured such that the user is capable of inputting a scheduled departure time of the vehicle, and the timer charging is executed according to a time schedule set based on the input scheduled departure time. It should be noted that the MID 105 may be, for example, a mobile phone, a terminal, or the like that the user is remote-controllable from the outside of the vehicle.

The ECU 100 includes a central processing unit (CPU), a read only memory (ROM) which stores a processing program or the like, a random access memory (RAM) which temporarily stores data, and an input/output port for inputting/outputting various signals (all of them are not shown), and performs control of each device in the hybrid vehicle 1. It should be noted that such control may be processed not only by software, but also by dedicated hardware (electronic circuit).

As primary control in the ECU 100, the ECU 100 executes charging control for driving the charging device 150 to charge the power storage device 40 with the power supply 200 in a case where the connector of the charging cable is connected to the power receiving unit 160 and the execution of the external charging is requested.

The ECU 100 sets the time schedule of the external charging based on the scheduled departure time input and set by the user on the MID 510 and executes the timer charging in which the external charging starts according to the set time schedule. As an example, the ECU 100 determines a charging end time having a predetermine margin time with respect to the scheduled departure time based on the scheduled departure time of the vehicle. Next, the ECU 100 determines a start time of the external charging in consideration of a time required for the external charging, electricity charge at the time of the external charging, a standby time until the departure in a full charge state, or the like. Then, if the charging start time according to the set time schedule is reached, the ECU 100 turns on the SMR 45, outputs a command to drive the charging device 150 to the charging device 150, and executes the charging control for charging the power storage device 40 with the power supply 200.

The ECU 100 executes abnormality detection processing for determining whether or not an abnormality occurs in the EHC current sensor 180 which detects the current IE supplied to the EHC 85. If an abnormality occurs in the EHC current sensor 180, it is not possible to correctly ascertain electric power supplied to the EHC 85, and the following problems occur. For example, in a case where the detection value of the EHC current sensor 180 indicates a value higher than an actual current, electric power supplied to the EHC 85 becomes small, and there is a possibility that the EHC 85 is not sufficiently warmed up and the exhaust purification performance of the EHC 85 is deteriorated. In a case where the detection value of the EHC current sensor 180 indicates a value lower than the actual current, electric power supplied to the EHC 85 becomes excessive, a locally overheated portion is generated in the EHC 85, and cracking of the catalyst carrier 300 (FIG. 2) of the EHC 85 may occur due to thermal stress. Accordingly, although it is necessary to detect an abnormality of the EHC current sensor 180, duplexing of the EHC current sensor for detection of an abnormality of the EHC current sensor 180 causes increase in cost, an increase in facility size, or the like, and there is a possibility that marketability of the vehicle is damaged.

Accordingly, in the hybrid vehicle 1 according to this embodiment, the detection of an abnormality of the EHC current sensor 180 is executed using the detection value of the existing charging current sensor 175 which detects the current ICH received from the power supply 200 by the charging device 150 at the time of the execution of the external charging. Specifically, the ECU 100 turns on the EHC relay 90 such that electric power received from the power supply 200 is supplied to the EHC 85, drives the AC/DC converter 165, and estimates a current (hereinafter, referred to as an "EHC current") supplied to the EHC 85 using the detection value of the charging current sensor 175. Then, the ECU 100 compares the estimated value of the EHC current with the detection value of the EHC current sensor 180, and in a case where the estimated value and the detection value are different, determines that the EHC current sensor 180 is abnormal.

In a case where the external charging is started and the detection of an abnormality of the EHC current sensor 180 is executed during reception of electric power from the power supply 200, it is necessary to consider a user's intention to secure the amount of charge of the power storage device 40 through the external charging for next traveling early.

Accordingly, in the hybrid vehicle 1 according to this embodiment, in a case where the external charging is started while the timer charging is not set and the detection of an abnormality of the EHC current sensor 180 is executed during reception of electric power from the power supply 200, the ECU 100 executes the abnormality detection when the SOC of the power storage device 40 is equal to or greater than a predetermined amount. With this, it is possible to respond to a user's request to secure the amount of charge of the power storage device 40 through the external charging for next traveling early.

In a case where the timer charging is set by the MID 105, if the abnormality detection is executed during the execution of the timer charging, deviation (delay) occurs in the time schedule of the timer charging. In a case where the timer charging is cancelled and departure is performed, a situation in which the abnormality detection is not executed may occur.

Accordingly, in the hybrid vehicle 1 according to this embodiment, the ECU 100 executes the detection of an abnormality of the EHC current sensor 180 before the execution of the timer charging in a case where the timer charging is set. That is, the ECU 100 turns on the SMR 45 and the EHC relay 90 such that electric power is supplied from the power storage device 40 to the EHC 85 through the charging device 150, drives the DC/DC converter 170 of the charging device 150, and executes the abnormality detection using the detection value of the existing current sensor 110 which detects the output current of the power storage device 40. Specifically, the ECU 100 estimates the EHC current supplied from the power storage device 40 to the EHC 85 using the detection value of the current sensor 110, and in a case where the estimated value of the EHC current and the detection value of the EHC current sensor 180 are different, determines that the EHC current sensor 180 is abnormal.

Figure 3:
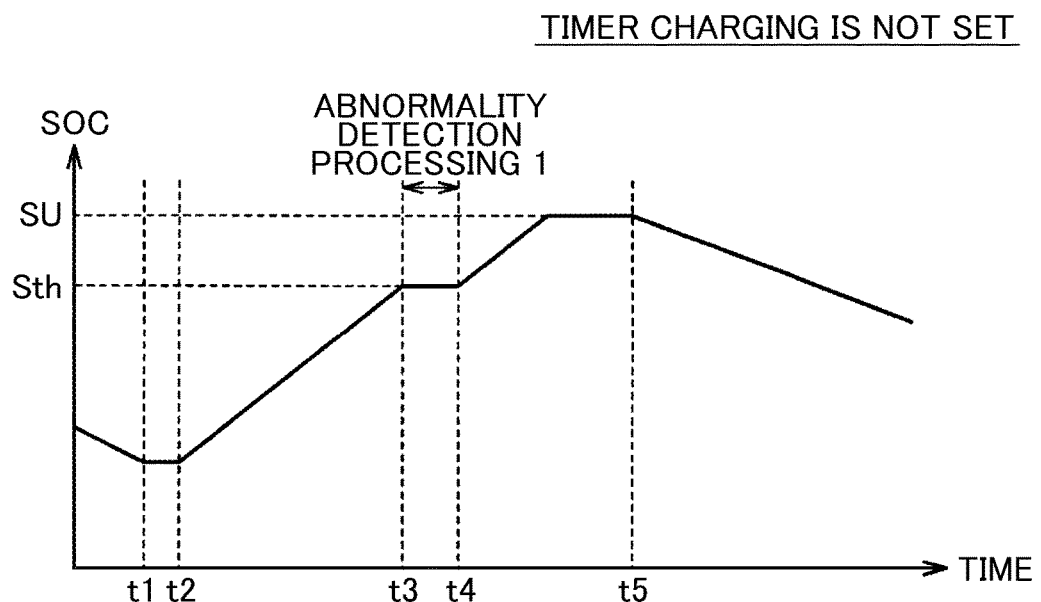
FIG. 3 is a diagram illustrating the timing of abnormality detection processing in a case where timer charging is not set.

FIG. 3 is a diagram illustrating the timing of the abnormality detection processing in a case where the timer charging is not set. Referring to FIG. 3, the vertical axis indicates the SOC of the power storage device 40 and the horizontal axis indicates transition of the time. It is assumed that, at time t1, the vehicle is stopped at a location, such as home, where there is a charging facility. At time t2, if the connect of the charging cable is connected to the power receiving unit 160 (FIG. 1), in a case where the timer charging is not set, the external charging is started.

In a case where the connector of the charging cable is connected to the power receiving unit 160 while the timer charging is not set, the user may intend to secure the amount of charge of the power storage device 40 for next traveling early. Accordingly, in a case where the timer charging is not set, the external charging is first performed until the SOC reaches a predetermined threshold Sth, and if the SOC reaches the threshold Sth at time t3, the detection of an abnormality of the EHC current sensor 180 is executed using the detection value of the charging current sensor 175 (abnormality detection processing 1).

During the execution of the abnormality detection, charging of the power storage device 40 is stopped. Charging of the power storage device 40 is stopped during the execution of the abnormality detection, whereby it is possible to increase the estimation accuracy of the EHC current using the detection value of the charging current sensor 175. Then, from the viewpoint of securing the amount of charge of the power storage device 40 through the external charging early, the threshold Sth is set to a high value to some extent, and is set to, for example, a predetermined value equal to or greater than 50%. With this, it is possible to respond a user's request to secure the amount of charge of the power storage device 40 through the external charging for next traveling early.

Thereafter, at time t4, if the detection of an abnormality of the EHC current sensor 180 ends, since the SOC does not reach a value SU of the full charge capacity, charging of the power storage device 40 is restarted. Then, if the SOC reaches the value SU (full charge state), the external charging ends, and at time t5, traveling is started.

Figure 4:
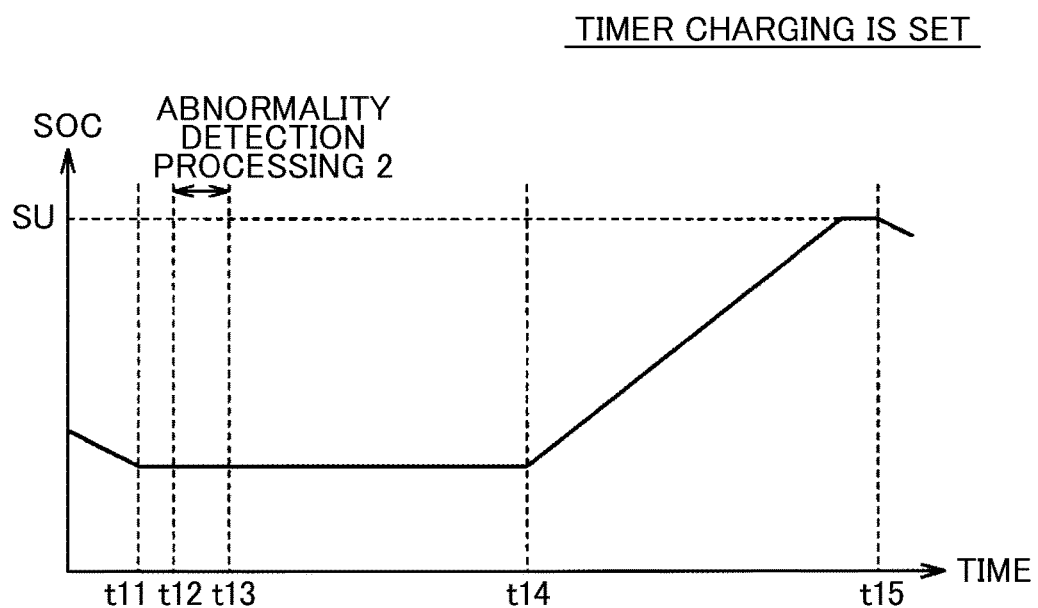
FIG. 4 is a diagram illustrating the timing of the abnormality detection processing in a case where the timer charging is set.

FIG. 4 is a diagram illustrating the timing of the abnormality detection processing in a case where the timer charging is set. Referring to FIG. 4, as in FIG. 3, the vertical axis indicates the SOC of the power storage device 40 and the horizontal axis indicates transition of the time. It is assumed that, at time t11, the vehicle is stopped at a location, such as home, where there is a charging facility. In a situation in which the timer charging is set, at time t12, if the connector of the charging cable is connected to the power receiving unit 160, the external charging is on standby for execution (power reception standby state), and the detection of an abnormality of the EHC current sensor 180 is executed (abnormality detection processing 2).

At time t13, the detection of an abnormality of the EHC current sensor 180 ends before the timer charging is started, and at time t14, the timer charging is started according to the set time schedule. Thereafter, the timer charging ends according to the time schedule, and at time t15, traveling is started.

In this way, in a case where the timer charging is set, the detection of an abnormality of the EHC current sensor 180 is executed before the execution of the timer charging, and the abnormality detection is not executed during the execution of the timer charging. Therefore, it is possible to avoid a situation in which charging is delayed due to the execution of the abnormality detection during the execution of the timer charging or the abnormality detection is not executed in a case where the timer charging is cancelled and departure is performed.

Hereinafter, a procedure of the abnormality detection processing of the EHC current sensor 180 which is executed by the ECU 100 will be described in detail.

Figure 5:
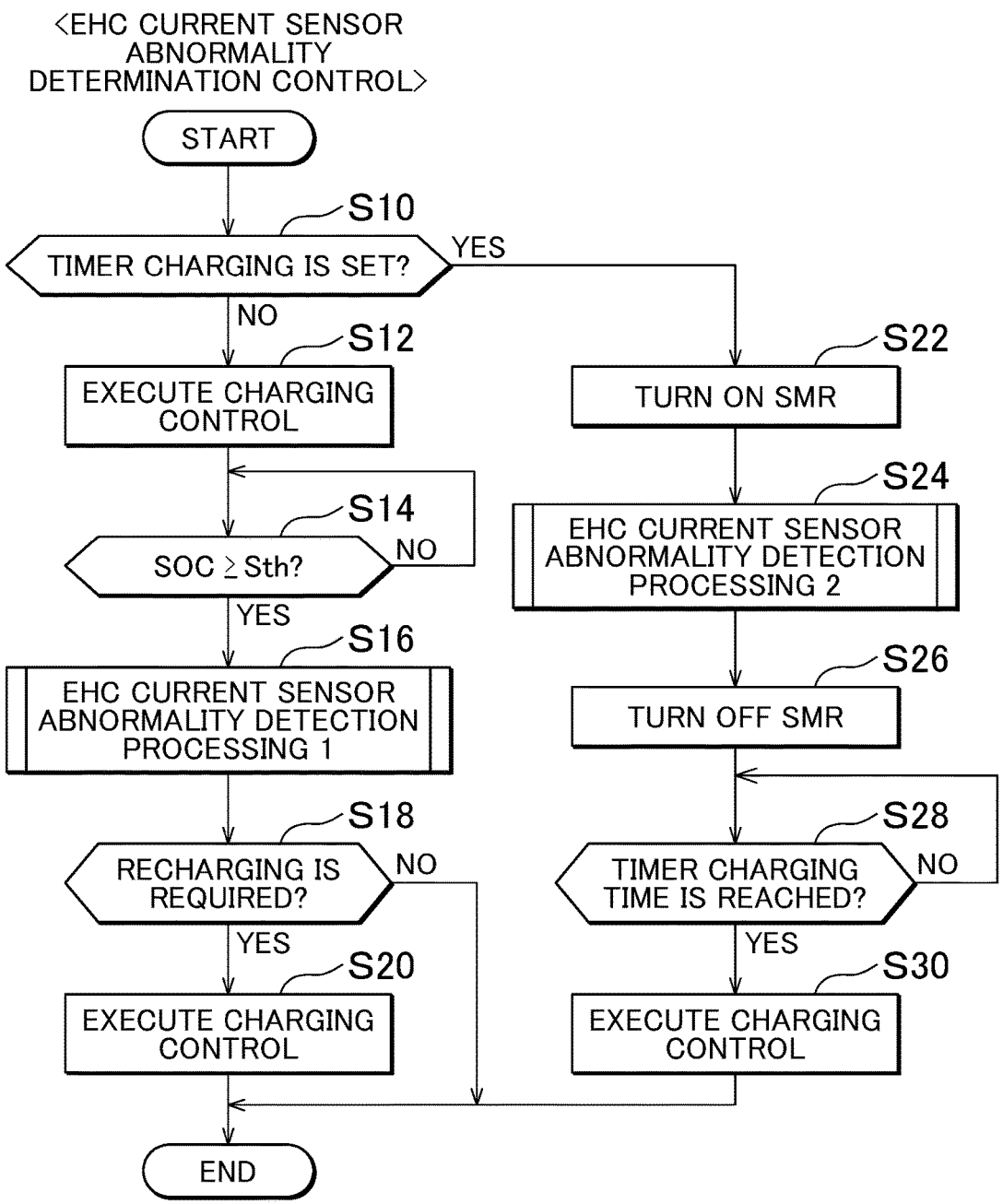
FIG. 5 is a flowchart illustrating a processing procedure of abnormality determination control of an EHC current sensor which is executed by an ECU.

FIG. 5 is a flowchart illustrating a processing procedure of abnormality determination control of the EHC current sensor 180 which is executed by the ECU 100. This flowchart is executed when the connector of the charging cable is connected to the power receiving unit 160 (FIG. 1), and as an example, is executed at the timing when the connector is connected to the power receiving unit 160.

Referring to FIG. 5, the ECU 100 determines whether or not the timer charging is set (Step S10). If it is determined that the timer charging is not set (in Step S10, NO), the ECU 100 turns on the SMR 45, drives the charging device 150, and executes the charging control for charging the power storage device 40 with the power supply 200 (Step S12).

During the execution of the charging control, the ECU 100 determines whether or not the SOC of the power storage device 40 becomes equal to or greater than the threshold Sth (Step S14). As described above, from the viewpoint of securing the amount of charge of the power storage device 40 through the external charging for next traveling early, the above-described threshold Sth is set to a high value to some extent, and is set to, for example, a predetermined value equal to or greater than 50%.

If it is determined that the SOC is equal to or greater than the threshold Sth (in Step S14, YES), the ECU 100 executes EHC current sensor abnormality detection processing 1 (hereinafter, simply referred to as "abnormality detection processing 1") (Step S16). The abnormality detection processing 1 is to execute the detection of an abnormality of the EHC current sensor 180 at the time of reception of electric power from the power supply 200 using the detection value of the charging current sensor 175 (FIG. 1) which detects the current ICH received from the power supply 200 by the charging device 150. The details of the abnormality detection processing 1 will be described below.

If the abnormality detection processing 1 ends, the ECU 100 determines whether or not recharging of the power storage device 40 is required (Step S18). For example, if the threshold Sth is set to a value corresponding to the full charge state in Step S14 and the SOC does not decrease at the time of the end of the abnormality detection processing 1, recharging is not required. In a case where the threshold Sth is set to a value lower than the value corresponding to the full charge state, a case where a decrease in SOC is observed, recharging is required.

If it is determined in Step S18 that recharging is required (in Step S18, YES), the ECU 100 drives the charging device 150 again to execute the charging control (Step S20). Though not particularly shown, if the SOC reaches the threshold SU corresponding to the full charge capacity, the ECU 100 stops the charging device 150 and turns off the SMR 45 to end the external charging.

If it is determined in Step S10 that the timer charging is set (in Step S10, YES), the ECU 100 turns on the SMR 45 (Step S22). Then, the ECU 100 executes EHC current sensor abnormality detection processing 2 (hereinafter, simply referred to as "abnormality detection processing 2") (Step S24). The abnormality detection processing 2 is to execute the detection of an abnormality of the EHC current sensor 180 before the execution of the timer charging in a case where the timer charging is set. Since the abnormality detection processing 2 is executed before the execution of the timer charging (on standby for reception of electric power from the power supply 200), unlike the abnormality detection processing 1, it is not possible to perform the abnormality detection using the charging current sensor 175. Accordingly, in the abnormality detection processing 2, the SMR 45 is turned on to supply electric power from the power storage device 40 to the EHC 85 through the charging device 150, and the detection of an abnormality of the EHC current sensor 180 is executed before the execution of the timer charging using the detection value of the current sensor 110 (FIG. 1) which detects the input/output current of the power storage device 40. The details of the abnormality detection processing 2 will be described below.

If the abnormality detection processing 2 ends, the ECU 100 turns off the SMR 45 (Step S26). Thereafter, the ECU 100 determines whether or not the start time of the timer charging is reached (Step S28). Then, if the start time of the timer charging is reached (in Step S28, YES), the ECU 100 turns on the SMR 45, drives the charging device 150, and executes the charging control for charging the power storage device 40 with the power supply 200 (Step S30).

FIG. 6 is a flowchart illustrating a procedure of the abnormality detection processing 1 which is executed in Step S16 of FIG. 5. Referring to FIG. 6, the ECU 100 executes an initial check of the EHC current sensor 180 (Step S110). In the initial check, for example, a check about whether or not zero point learning of the EHC current sensor 180 ends or whether or not a detection signal line is disconnected or short-circuited is executed. If it is determined that there is an abnormality in the initial check (in Step S112, YES), the ECU 100 progresses the process to Step S124 and determines that the EHC current sensor 180 is abnormal.

If it is determined in Step S112 that there is no abnormality in the initial check (in Step S112, NO), the ECU 100 turns on the EHC relay 90 (Step S114). Next, the ECU 100 controls the AC/DC converter 165 of the charging device 150 such that predetermined electric power is supplied to the EHC 85 (Step S116). The predetermined electric power may be comparatively small electric power for the detection of an abnormality of the EHC current sensor 180, and large electric power for increasing the temperature of the EHC 85 is not required.

In this embodiment, charging of the power storage device 40 is stopped during the execution of the abnormality detection processing 1, and the ECU 100 stops the DC/DC converter 170 of the charging device 150 during the execution of the abnormality detection processing 1.

Next, the ECU 100 acquires the detection value (hereinafter, referred to as "detection value 1") of the charging current sensor 175 which detects the current ICH received from the power supply 200 by the charging device 150 (Step S118). In addition, the ECU 100 acquires the detection value (hereinafter, referred to as "detection value 2") of the EHC current sensor 180 (Step S120).

Then, the ECU 100 determines whether or not the absolute value of the difference between the detection value 1 from the charging current sensor 175 acquired in Step S118 and the detection value 2 from the EHC current sensor 180 acquired in Step S120 is greater than a predetermined threshold (Step S122). The threshold is a determination value for determining that the EHC current sensor 180 is abnormal in a case where the detection value of the EHC current sensor 180 and the detection value of the charging current sensor 175 are different.

That is, if it is determined in Step S122 that the absolute value of the difference between the detection value 1 from the charging current sensor 175 and the detection value 2 from the EHC current sensor 180 is greater than the threshold (in Step S122, YES), the ECU 100 determines that the EHC current sensor 180 is abnormal (Step S124). Thereafter, the ECU 100 turns off the EHC relay 90 (Step S126).

In a case where it is determined in Step S122 that the absolute value of the difference between the detection value 1 from the charging current sensor 175 and the detection value 2 from the EHC current sensor 180 is equal to or less than the threshold (in Step S122, NO), the ECU 100 determines that the EHC current sensor 180 is normal and progresses the process to Step S126.

FIG. 7 is a flowchart illustrating a procedure of the abnormality detection processing 2 which is executed in Step S30 of FIG. 5. Referring to FIG. 7, the ECU 100 executes an initial check of the EHC current sensor 180 (Step S210), and determines the presence or absence of an abnormality in the initial check (Step S212). The processing executed in Steps S210 and S212 are respectively the same as the processing executed in Steps S110 and S112 of the abnormality detection processing 1 shown in FIG. 6.

If it is determined in Step S212 that there is no abnormality in the initial check (in Step S212, NO), the ECU 100 executes the detection of an abnormality of the EHC current sensor 180 using the detection value of the current sensor 110 which detects the input/output current of the power storage device 40. Specifically, as described below, the EHC current supplied from the power storage device 40 to the EHC 85 is estimated using the detection value of the current sensor 110, and the detection of an abnormality of the EHC current sensor 180 is performed by comparing the estimated value of the EHC current with the detection value of the EHC current sensor 180.

Specifically, the ECU 100 generates a command to reduce currents supplied from the power storage device 40 to other components excluding the EHC 85 (Step S216). The detection value of the current sensor 110 includes, in addition to the EHC current supplied from the power storage device 40 to the EHC 85, a current supplied from the power storage device 40 to the electric air conditioner 75 and a current supplied from the power storage device 40 to the accessory 70 through the DC/DC converter 65. Accordingly, in order to increase the estimation accuracy of the EHC current using the detection value of the current sensor 110, the currents supplied from the power storage device 40 to the electric air conditioner 75 and the accessory 70 (other components) are reduced during the execution of the abnormality detection.

As described below, the EHC current is estimated by subtracting the currents supplied from the power storage device 40 to the electric air conditioner 75 and the accessory 70 from the detection value of the current sensor 110. For this reason, while the currents supplied from the power storage device 40 to the electric air conditioner 75 and the accessory 70 (other components) are not necessarily 0, it is possible to increase the estimation accuracy of the EHC current by reducing these currents.

In regard to the current reduction command, specifically, the ECU 100 generates a command to reduce the power consumption of the electric air conditioner 75 and outputs the generated command to the electric air conditioner 75. If the electric air conditioner 75 is stoppable, the ECU 100 may output a stop command to the electric air conditioner 75. Furthermore, the ECU 100 generates a command to reduce electric power supplied from the DC/DC converter 65 to the accessory 70 and outputs the generated command to the DC/DC converter 65. For example, the ECU 100 makes an output voltage command of the DC/DC converter 65 lower than the voltage of the accessory 70. With this, it is possible to make electric power supplied from the DC/DC converter 65 to the accessory 70 zero.

In the abnormality detection processing 1 shown in FIG. 6, such a current reduction command is not generated. In the abnormality detection processing 1 which is executed in a case where the timer charging is not set, charging of the power storage device 40 is stopped during the execution of the abnormality detection, and the detection of an abnormality of the EHC current sensor 180 is executed by comparing the detection value of the charging current sensor 175 with the detection value of the EHC current sensor 180 when electric power is supplied from the power receiving unit 160 to the EHC 85 through the charging device 150. Accordingly, in the abnormality detection processing 1, in order to estimate the EHC current using the detection value of the charging current sensor 175, it is not necessary to reduce the currents supplied to other component excluding the EHC 85.

In the abnormality detection processing 2 which is executed in a case where the timer charging is set, the detection of an abnormality of the EHC current sensor 180 is executed before the execution of the timer charging by comparing the detection value of the current sensor 110 and the detection value of the EHC current sensor 180 when electric power is supplied from the power storage device 40 to the EHC 85 through the pair of power lines PL1, NL1 and the charging device 150. In this case, as described above, the detection value of the current sensor 110 includes, in addition to the EHC current supplied from the power storage device 40 to the EHC 85, the current supplied to the electric air conditioner 75 connected to the pair of power lines PL1, NL1 and the current supplied from the pair of power lines PL1, NL1 to the accessory 70 through the DC/DC converter 65. Accordingly, in the abnormality detection processing 2, in order to increase the estimation accuracy of the EHC current using the detection value of the current sensor 110, the currents supplied from the power storage device 40 to the electric air conditioner 75 and the accessory 70 (other components) are reduced during the execution of the abnormality detection (Step S216).

After the execution of Step S216, the ECU 100 turns on the EHC relay 90 (Step S218). Next, the ECU 100 controls the DC/DC converter 170 of the charging device 150 such that predetermined electric power is supplied to the EHC 85 (Step S220). The predetermined electric power may be comparatively small electric power for the detection of an abnormality of the EHC current sensor 180, and large electric power for increasing the temperature of the EHC 85 is not required.

Next, the ECU 100 acquires the detection values of the currents from the current sensor 110 which detects the input/output current of the power storage device 40 and other current sensors 115, 125 (Step S222). Then, the ECU 100 calculates the estimated value of the EHC current supplied to the EHC 85 using the detection values acquired in Step S222 (Step S224).

Specifically, the ECU 100 calculates an input current of the DC/DC converter 65 from the detection value of the current sensor 125 and calculates the estimated value of the EHC current by subtracting the calculated input current of the DC/DC converter 65 and the detection value of the current sensor 115 from the detection value of the current sensor 110. The input current of the DC/DC converter 65 is calculated by dividing a value, which is obtained by multiplying the detection value of the current sensor 125 by an output voltage of the DC/DC converter 65, by an input voltage of the DC/DC converter 65. The output voltage of the DC/DC converter 65 may be detected by a voltage sensor (not shown) or may be the output voltage command of the DC/DC converter 65. For the input voltage of the DC/DC converter 65, a voltage detection value of the power storage device 40 can be used.

Subsequently, the ECU 100 acquires the detection value of the EHC current sensor 180 (Step S226). Then, the ECU 100 determines whether or not the absolute value of the difference between the detection value of the EHC current sensor 180 detected in Step S226 and the estimated value of the EHC current calculated in Step S224 is greater than a predetermined threshold (Step S228). The threshold is a determination value for determining that the EHC current sensor 180 is abnormal in a case where the detection value of the EHC current sensor 180 and the estimated value of the EHC current calculated using the current sensor 110 are different.

That is, if it is determined in Step S228 that the absolute value of the difference between the detection value of the EHC current sensor 180 and the estimated value of the EHC current calculated using the current sensor 110 is greater than the threshold (in Step S228, YES), the ECU 100 determines that the EHC current sensor 180 is abnormal (Step S230). Thereafter, the ECU 100 turns off the EHC relay 90 (Step S232), and returns current reduction of other components executed in Step S216 (Step S234).

In a case where it is determined in Step S228 that the absolute value of the difference between the detection value of the EHC current sensor 180 and the estimated value of the EHC current is equal to or less than the threshold (in Step S228, NO), the ECU 100 determines that the EHC current sensor 180 is normal and progresses the process to Step S232.

As described above, in this embodiment, in a case where electric power is supplied to the EHC 85 during reception of electric power from the power supply 200 (a case where the timer charging is not set), since the current supplied to the EHC 85 is estimated using the detection value of the charging current sensor 175, and an abnormality of the EHC current sensor 180 is detected by comparing the estimated value with the detection value of the EHC current sensor 180, it is not necessary to duplex the EHC current sensor in order to detect an abnormality of the EHC current sensor 180. Furthermore, since the above-described abnormality detection is executed when the SOC of the power storage device 40 is equal to or greater than the predetermined amount, it is possible to respond to a user's request to secure the SOC for next traveling early. Therefore, according to this embodiment, it is possible to detect an abnormality of the EHC current sensor 180 without duplexing the EHC current sensor while considering a user's request for the external charging.

In a case where the timer charging is set, since the detection of an abnormality of the EHC current sensor 180 is executed before the execution of the timer charging, it is possible to avoid a situation in which charging is delayed due to the execution of the abnormality detection during the execution of the timer charging or the abnormality detection is not executed in a case where the timer charging is cancelled and departure is performed. Then, since the external charging is on standby for execution (power reception standby state) before the execution of the timer charging, in this embodiment, electric power is supplied from the power storage device 40 to the EHC 85 through the charging device 150, and the current supplied to the EHC 85 is estimated using the detection value of the current sensor 110. Therefore, according to this embodiment, it is possible to detect an abnormality of the EHC current sensor 180 without duplexing the EHC current sensor while enabling the execution of the timer charging according to the time schedule.

In the above-described embodiment, although the hybrid vehicle 1 is a hybrid vehicle having a configuration in which the engine 10 and the motor generators 15, 20 are connected by the power distribution device 25, a hybrid vehicle to which the disclosure is applied is not limited to a hybrid vehicle having such a configuration. For example, the disclosure is applicable to a so-called series type hybrid vehicle in which the engine 10 is used only for driving the motor generator 15 and the drive power of the vehicle is generated only with the motor generator 20.

In the above description, the EHC current sensor 180 corresponds to an example of a "first current sensor", and the charging current sensor 175 corresponds to an example of a "second current sensor". The ECU 100 corresponds to an example of a "control device", and the current sensor 110 corresponds to an example of a "third current sensor".

The embodiment disclosed herein is illustrative and not restrictive in all sorts of points. The scope of the disclosure is defined by the appended claims rather than the description of the embodiment described above, and is intended to encompass all modifications within the scope of the appended claims and equivalents thereof.

What is claimed is:

1. A hybrid vehicle in which an internal combustion engine and an electric motor for vehicle traveling are mounted, the hybrid vehicle comprising:

a power storage device configured to store electric power supplied to the electric motor;

a charging device configured to receive electric power from an external power supply provided outside the hybrid vehicle to charge the power storage device;

an electrically heated catalyst device including a catalyst configured to purify exhaust gas discharged from the internal combustion engine and configured to receive electric power through the charging device to electrically heat the catalyst;

a first current sensor configured to detect a current supplied to the electrically heated catalyst device;

a second current sensor configured to detect a current received from the external power supply by the charging device;

a third current sensor configured to detect an input/output current of the power storage device; and a control device configured to execute abnormality detection processing for detecting an abnormality of the first current sensor, wherein the abnormality detection processing includes first processing which is executed in a case where, during reception of electric power from the external power supply, (i) a state of charge of the power storage device is equal to or greater than a predetermined amount and (ii) electric power is supplied to the electrically heated catalyst device, and the first processing includes processing for detecting an abnormality of the first current sensor by estimating a value of the current supplied to the electrically heated catalyst device using a detection value of the second current sensor and comparing the estimated value with a detection value of the first current sensor, wherein the control device is configured to execute timer charging for charging the power storage device according to a set time schedule with the external power supply through the charging device, the abnormality detection processing further includes second processing which is executed instead of the first processing before the execution of the timer charging in a case where the timer charging is set, and the second processing includes processing for detecting an abnormality of the first current sensor by controlling the charging device such that electric power is supplied from the power storage device to the electrically heated catalyst device through the charging device, estimating a value of the current supplied to the electrically heated catalyst device using a detection value of the third current sensor, and comparing the estimated value with the detection value of the first current sensor.

2. The hybrid vehicle according to claim 1, wherein the control device stops the reception of electric power of the power storage device during processing for detecting an abnormality of the first current sensor.

3. A hybrid vehicle in which an internal combustion engine and an electric motor for vehicle traveling are mounted, the hybrid vehicle comprising:
 a power storage device configured to store electric power supplied to the electric motor;
 a charging device configured to receive electric power from an external power supply provided outside the hybrid vehicle to charge the power storage device;
 an electrically heated catalyst device including a catalyst configured to purify exhaust gas discharged from the internal combustion engine and configured to receive electric power through the charging device to electrically heat the catalyst;
 a first current sensor configured to detect a current supplied to the electrically heated catalyst device;
 a second current sensor configured to detect a current received from the external power supply by the charging device;
 an accessory; and
 a control device configured to execute abnormality detection processing for detecting an abnormality of the first current sensor,
 wherein the abnormality detection processing includes first processing which is executed in a case where, during reception of electric power from the external power supply, (i) a state of charge of the power storage device is equal to or greater than a predetermined amount and (ii) electric power is supplied to the electrically heated catalyst device,
 the first processing includes processing for detecting an abnormality of the first current sensor by estimating a value of the current supplied to the electrically heated catalyst device using a detection value of the second current sensor and comparing the estimated value with a detection value of the first current sensor, and
 the control device reduces a current supplied to the accessory during the processing for detecting an abnormality of the first current sensor.

4. A hybrid vehicle in which an internal combustion engine and an electric motor for vehicle traveling are mounted, the hybrid vehicle comprising:
 a power storage device configured to store electric power supplied to the electric motor;
 a charging device configured to receive electric power from an external power supply provided outside the hybrid vehicle to charge the power storage device;
 an electrically heated catalyst device including a catalyst configured to purify exhaust gas discharged from the internal combustion engine and configured to receive electric power through the charging device to electrically heat the catalyst;
 a first current sensor configured to detect a current supplied to the electrically heated catalyst device;
 a second current sensor configured to detect a current received from the external power supply by the charging device; and
 a control device configured to execute abnormality detection processing for detecting an abnormality of the first current sensor,
 wherein the abnormality detection processing includes first processing which is executed in a case where, during reception of electric power from the external power supply, (i) a state of charge of the power storage device is equal to or greater than a predetermined amount and (ii) electric power is supplied to the electrically heated catalyst device,
 the first processing includes processing for detecting an abnormality of the first current sensor by estimating a value of the current supplied to the electrically heated catalyst device using a detection value of the second current sensor and comparing the estimated value with a detection value of the first current sensor, and
 the control device determines that the first current sensor is abnormal in a case where an absolute value of a difference between the detection value of the first current sensor and the estimated value is greater than a threshold.

* * * * *